United States Patent [19]
Tang et al.

[11] Patent Number: 5,941,094
[45] Date of Patent: Aug. 24, 1999

[54] TRIPLE-EFFECT ABSORPTION REFRIGERATION SYSTEM HAVING A COMBUSTION CHAMBER COOLED WITH A SUB-AMBIENT PRESSURE SOLUTION STREAM

[75] Inventors: Jingsong Tang; Jay A. Kohler, both of York, Pa.

[73] Assignee: York International Corporation, York, Pa.

[21] Appl. No.: 09/080,232

[22] Filed: May 18, 1998

[51] Int. Cl.$^6$ .................................................... F25B 33/00
[52] U.S. Cl. ............................................ 62/497; 62/489
[58] Field of Search ............................ 62/101, 476, 497, 62/483, 485, 489

[56] References Cited

U.S. PATENT DOCUMENTS

| | | | |
|---|---|---|---|
| 2,453,823 | 11/1948 | Williams | 62/115 |
| 3,266,266 | 8/1966 | Reid, Jr. | 62/476 |
| 3,316,728 | 5/1967 | Biermann | 62/112 |
| 3,452,550 | 7/1969 | Dyre et al. | 62/85 |
| 3,541,013 | 11/1970 | Macriss et al. | 252/69 |
| 3,593,540 | 7/1971 | Hopkins | 62/476 |
| 3,742,728 | 7/1973 | Mamiya | 62/476 |
| 3,783,631 | 1/1974 | Modahl et al. | 62/112 |
| 3,817,050 | 6/1974 | Alexander et al. | 62/101 |
| 3,831,397 | 8/1974 | Mamiya | 62/476 |
| 3,928,983 | 12/1975 | Ainbinder et al. | 62/101 |
| 3,949,566 | 4/1976 | Hopkins | 62/475 |
| 3,977,204 | 8/1976 | Bourne | 62/85 |
| 4,183,228 | 1/1980 | Saito et al. | 62/497 |
| 4,315,411 | 2/1982 | Vardi et al. | 62/112 |
| 4,333,515 | 6/1982 | Wilkinson et al. | 165/1 |
| 4,439,999 | 4/1984 | Mori et al. | 62/238.3 |
| 4,475,361 | 10/1984 | Alefeld | 62/476 |
| 4,520,634 | 6/1985 | Oouchi et al. | 62/476 |
| 4,542,628 | 9/1985 | Sarkisian et al. | 62/335 |
| 4,542,629 | 9/1985 | Biermann | 62/476 |
| 4,546,620 | 10/1985 | Biermann | 62/476 |
| 4,548,048 | 10/1985 | Reimann et al. | 62/238.3 |
| 4,551,991 | 11/1985 | Miyoshi et al. | 62/476 |

(List continued on next page.)

FOREIGN PATENT DOCUMENTS

| | | |
|---|---|---|
| 278076 | 9/1914 | Germany . |
| 1068671 | 2/1982 | U.S.S.R. . |
| 1208467 | 10/1970 | United Kingdom . |
| WO 90/12848 | 11/1990 | WIPO . |
| WO 93/11393 | 6/1993 | WIPO . |
| WO 95/09334 | 4/1995 | WIPO . |

*Primary Examiner*—William Doerrler
*Attorney, Agent, or Firm*—Finnegan, Henderson, Farabow, Garrett & Dunner, L.L.P.

[57] ABSTRACT

A pressure-staged absorption refrigeration apparatus having a direct-fired combustion chamber is provided. The refrigeration apparatus includes an evaporator and an absorber operatively connected to the evaporator. A plurality of generators is provided, each generator operatively connected, directly or indirectly, to the absorber. Each generator receives one of a plurality of absorption solution streams and discharges another of the absorption solution streams. Each generator also discharges one of a plurality of refrigerant vapor streams. One generator operates at a first temperature, and one generator operates at a sub-ambient pressure. A plurality of condensers is also provided, each condenser operatively connected to one of the generators from which the condenser receives one of the refrigerant vapor streams. Furthermore, each condenser is operatively connected to the evaporator and discharges one of a plurality of refrigerant liquid streams. A direct-fired combustion chamber for generating combustion gases is provided. The combustion chamber is cooled by one of the absorption solution streams. A piping arrangement transfers heat stored in the combustion gases to the absorption solution stream in the generator operating at the first temperature. A pressure equalization device is operatively connected to the absorption solution stream cooling the combustion chamber to maintain the absorption solution stream cooling the combustion chamber at pressure less than ambient.

26 Claims, 5 Drawing Sheets

U.S. PATENT DOCUMENTS

| | | | |
|---|---|---|---|
| 4,637,218 | 1/1987 | Tchernev | 62/106 |
| 4,732,008 | 3/1988 | DeVault | 62/79 |
| 4,827,728 | 5/1989 | DeVault et al. | 62/79 |
| 4,921,515 | 5/1990 | Dao | 62/335 |
| 4,926,659 | 5/1990 | Christensen et al. | 62/476 |
| 5,033,274 | 7/1991 | Erickson | 62/476 |
| 5,186,009 | 2/1993 | Rockenfeller | 62/112 |
| 5,205,136 | 4/1993 | DeVault et al. | 62/476 |
| 5,284,029 | 2/1994 | Keuper et al. | 62/476 |
| 5,335,515 | 8/1994 | Rockenfeller et al. | 62/476 |
| 5,390,509 | 2/1995 | Rockenfeller et al. | 62/476 |
| 5,467,614 | 11/1995 | DeVault | 62/476 |
| 5,584,193 | 12/1996 | Biermann | 62/476 |
| 5,704,225 | 1/1998 | Sawakura et al. | 62/497 |
| 5,727,397 | 3/1998 | He | 62/476 |
| 5,771,711 | 6/1998 | Kubota | 62/497 |

FIG. 4

TRIPLE-EFFECT ABSORPTION REFRIGERATION SYSTEM HAVING A COMBUSTION CHAMBER COOLED WITH A SUB-AMBIENT PRESSURE SOLUTION STREAM

BACKGROUND OF THE INVENTION

1. Field of the Invention

The present invention relates to a triple-effect absorption refrigeration system. Particularly, the present invention relates to a triple-effect absorption refrigeration system using a direct-fired heat source to heat its high temperature generator. More particularly, the present invention relates to cooling the combustion chamber of the direct-fired heat source with a sub-ambient pressure solution stream.

2. Description of the Related Art

Absorption refrigeration systems are generally used to cool commercial buildings. A single-effect absorption refrigeration system typically comprises a generator, a condenser, an evaporator and an absorber. In this system, a refrigerant-containing absorption solution stream is heated in the generator by an outside heat source, such as a fuel burner, low-pressure steam, or hot water, in order to boil off refrigerant vapor. The refrigerant vapor is condensed to refrigerant liquid, and then routed to an evaporator. The refrigerant liquid in the evaporator absorbs the heat from the air in the commercial building being cooled, again flashing to vapor. The refrigerant vapor flows to an absorber, where it mixes with an absorption liquid, and the combined refrigerant-containing absorption solution stream is pumped to the generator.

The single-effect absorption system described above is extremely inefficient, having a thermal Coefficient of Performance (COP) of approximately 0.7.

A more efficient approach is to use a double-effect absorption refrigeration system. In this latter system, the single generator and condenser are replaced by two generators (a high temperature generator and a low temperature generator) and two condensers (also high temperature and low temperature). Primary heat is supplied to the high temperature generator to boil off refrigerant vapor from the refrigerant-containing absorption solution stream. The refrigerant vapor is condensed in the high temperature condenser. The heat of condensation from the high temperature condenser is used to heat the refrigerant-containing absorption solution stream in the low temperature generator, boiling off more vapor in that generator. In this manner, the heat input to the system is utilized twice to generate refrigerant vapor. The thermal COP of a double-effect absorption system hence is improved to approximately 1.2.

First stage generators of double-effect chillers may be either steam-driven or direct-fired. In commercially produced direct-fired double-effect chillers, a burner is used to produce high temperature combustion gases which heat the solution stream in the high temperature generator. Typically, the combustion chamber of a direct-fired double-effect chiller is a Scotch Marine-type boiler, where the combustion chamber and the generator are built as one component. Combustion takes place inside the combustion chamber, while combustion air flows through the chamber. Heat from the combustion air is transferred to the solution stream in the generator, thereby cooling the combustion air and boiling the solution stream. One advantage of this arrangement is that the combustion chamber wall is cooled by the solution stream on the other side, decreasing the temperature of the flame and the combustion wall. Heat exchanger tubes may be installed inside the combustion chamber to increase the heat transfer rate between the combustion air and the solution stream.

Conventional double-effect absorption chillers operate at sub-ambient pressure. Thus, although with a Scotch Marine-type boiler, the flame directly contacts the common combustion chamber/generator wall, the chamber is exempt from the ASME Boiler and Pressure Vessel Code, Section 1, entitled "Power Boilers" (ASME, Section 1), because the boiling of the solution stream occurs at a pressure less than ambient.

In recent years, experiments have been conducted with triple-effect absorption systems, utilizing three generators and three condensers with a single absorber and a single evaporator. In a triple-effect absorption system, the single generator and condenser are replaced by three generators (a high temperature generator, an intermediate temperature generator, and a low temperature generator) and three condensers (also high temperature, intermediate temperature, and low temperature). First, primary heat is supplied to the high temperature generator to boil off refrigerant vapor from the refrigerant-containing absorption solution stream. The refrigerant vapor is condensed in the high temperature condenser. Second, the heat of condensation from the high temperature condenser is used to heat the refrigerant-containing absorption solution stream in the intermediate temperature generator, boiling off refrigerant vapor in that generator. The refrigerant vapor from this intermediate temperature generator is then condensed in the intermediate temperature condenser. Third, the heat of condensation from this intermediate temperature condenser is used to heat the refrigerant-containing absorption solution stream in the low temperature generator, boiling off refrigerant vapor in that generator. Thus, triple-effect absorption systems use the primary heat input to the high temperature generator three times to generate refrigerant vapor.

Figure 1:
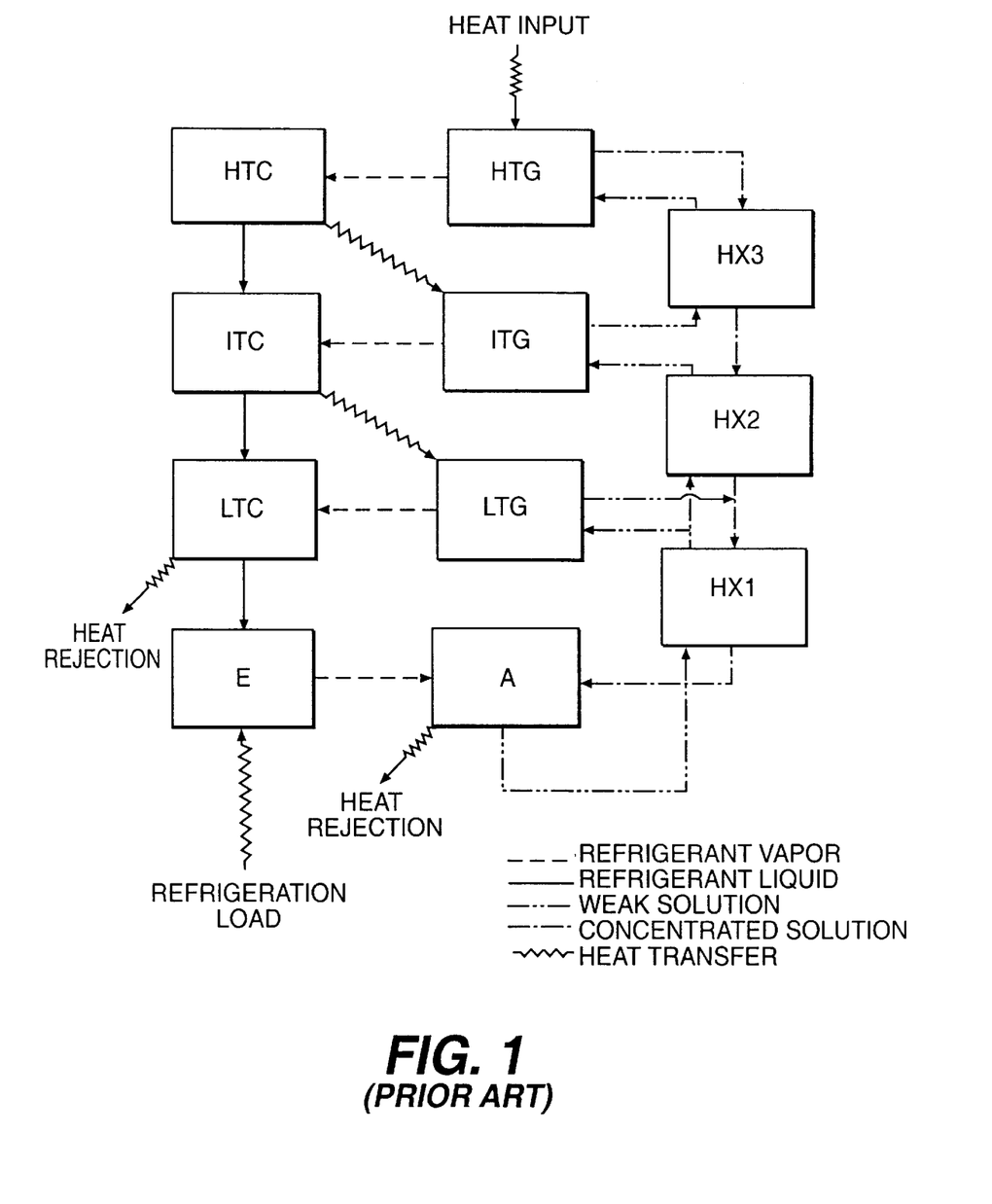
FIG. 1 depicts a triple-effect absorption refrigeration system with an inverse parallel series solution feeding arrangement.

FIG. 1 depicts a triple-effect absorption system which is fully described in U.S. patent application Ser. No. 08/743,373, filed Nov. 4, 1996, titled "Triple Effect Absorption Refrigeration System," the disclosure of which is incorporated herein by reference. An absorber A provides refrigerant-containing absorption solution stream to three generators, including a high-temperature generator HTG, an intermediate-temperature generator ITG, and a low-temperature generator LTG. Each generator feeds refrigerant vapor to a corresponding condenser, including a high-temperature condenser HTC, an intermediate-temperature condenser ITC, and a low-temperature condenser LTC. Furthermore, the high-temperature condenser HTC is coupled with the intermediate-temperature generator ITG, and the intermediate-temperature condenser ITC is coupled with the low-temperature generator LTG. Hence, the system is referred to as a double-coupled condenser (DCC) triple-effect absorption system. Heat exchangers HX1, HX2, and HX3 may be provided in the flowpath of the solution stream from the absorber.

The primary energy of the triple-effect absorption system is input to high-temperature generator HTG, where it heats the absorption solution stream and generates refrigerant vapor as described below. The refrigerant vapor generated from high-temperature generator HTG is condensed in high-temperature condenser HTC, and the heat of condensation is exchanged with intermediate-temperature generator ITG in order to generate refrigerant vapor in intermediate-temperature generator ITG, as described above. The condensate from high-temperature condenser HTC and the vapor from intermediate-temperature generator ITG pass into intermediate-temperature condenser ITC. The heat of condensation from intermediate-temperature condenser ITC is exchanged with low-temperature generator LTG in order to generate refrigerant vapor from low-temperature generator LTG as described above. The condensate from intermediate-temperature condenser ITC and the vapor from low-temperature generator LTG collect in low-temperature condenser LTC, and the resulting condensate is sent to evaporator E in order to obtain the desired refrigeration effect. The resultant low pressure vapor is then passed from evaporator E to absorber A, where it combines with the returning concentrated absorption solution stream to dilute the solution stream and begin a new cycle.

The triple-effect absorption system of FIG. 1 has an inverse parallel series solution feeding arrangement. Low-temperature generator LTG and intermediate-temperature generator ITG are connected to absorber A in a parallel flow arrangement, and high-temperature generator HTG is connected to intermediate-temperature generator ITG in a series flow arrangement. A weak absorption solution stream is fed from the absorber to the low-temperature generator LTG and to the intermediate-temperature generator ITG in parallel. The solution stream in intermediate-temperature generator ITG is heated, and refrigerant vapor is boiled off. The now more concentrated solution stream exits intermediate-temperature generator ITG and flows to high-temperature generator HTG. This solution stream is further concentrated as more refrigerant is boiled off, and then exits high-temperature generator HTG. Likewise, the weak solution in low-temperature generator LTG is concentrated as refrigerant is boiled off. This more concentrated solution stream exits low-temperature generator LTG, mixes with the solution stream exiting high-temperature generator HTG, and returns to absorber A. Computer simulations show that the inverse parallel series solution stream feeding arrangement of FIG. 1 provides a thermal COP of 1.720.

In order to achieve high performance levels, triple-effect absorption cycles operate at higher temperatures than double-effect or single-effect cycles. Typically, triple-effect cycles are calculated to operate with solution stream temperatures in the high temperature generator that are 100° F. to 150° F. higher than in a double-effect cycle. For example, typical double-effect refrigeration systems, using a lithium bromide-water solution stream, operate with solution stream temperatures leaving the high temperature generator of 300° F. to 330° F., while analysis of similar triple-effect refrigeration systems shows they would operate with solution stream temperatures leaving the high temperature generator of 400° F. to 480° F. As a result, triple-effect chillers will most likely be direct-fired.

The operating pressure of a triple-effect absorption system may be above or below ambient, depending on whether the system is absorber-coupled or condenser-coupled. If the system is absorber-coupled, as in a dual-loop cycle, then the operating pressure may be lower than ambient. One drawback to an absorber-coupled triple-effect system is that it requires an absorption solution having a much wider solubility than is available from the conventional absorption solution of lithium bromide-water. If the system is condenser-coupled, as in a pressure-staged triple-effect cycle, then the operating pressure is higher than ambient. The advantage of the condenser-coupled system is that it may use the conventional absorption solution of lithium bromide-water.

Most triple-effect systems considered for commercial applicability operate at a first stage generator pressure much higher than ambient pressure. The inverse parallel series flow cycle disclosed in U.S. patent application Ser. No. 08/743,373, noted above, is one example of a condenser-coupled, pressure-staged system. As predicted by thermodynamic analysis, the typical first stage pressure of this system is around 60 psia. However, even though the first stage generator of a condenser-coupled system typically operates above ambient pressure, the second stage generator typically operates under vacuum.

Because of their above ambient operating pressures, the first stage generators of condenser-coupled triple-effect chillers fall under the jurisdiction of ASME, Section 1, if they are directly contacted by the combustion chamber flame. One of the requirements of ASME, Section 1 is that such generators must be attended by a full time operator. The labor cost associated with such a full time operator is prohibitive and significantly affects the commercial viability of such condenser-coupled triple-effect chillers. Also, complying with ASME, Section 1 requires thicker construction, more safety devices, and the need to conform to Pressure Vessel codes. All of these requirements translate into higher design and fabrication costs.

One possible solution is to use an adiabatic combustion chamber in the direct-fired triple-effect chiller, thereby exempting its high pressure, first stage generator from ASME, Section 1. With an adiabatic combustion chamber, combustion and boiling take place in two different vessels. Combustion occurs in the adiabatic chamber which is insulated with refractory lining. No solution stream enters the chamber, thus, no boiling takes place in the combustion chamber. Rather, the combustion gases are directed to the first stage generator, where the high pressure solution stream absorbs heat from the gases and generates high pressure vapor. As long as the piping arrangement between the adiabatic combustion chamber and the high pressure generator ensures that the flame of the direct-fired burner does not contact the generator, the generator will not be governed by ASME, Section 1 requirements.

However, adiabatic combustion chambers have certain disadvantages. First, an adiabatic combustion chamber requires a fairly thick, high temperature refractory insulation, which is very expensive. Second, the high temperature radiant environment within an adiabatic chamber increases nitrous oxide (NOx) emissions. Increasing air flow through the chamber reduces the amount of NOx emissions, but increasing air flow also reduces the combustion efficiency. Thus, the cost and the NOx emission levels of such adiabatic combustion chambers are expected to be too high.

SUMMARY OF THE INVENTION

The present invention has been made in view of the above circumstances and is intended to provide a commercially viable triple-effect absorption refrigeration system by using a direct-fired combustion chamber, cooled by a solution stream at a sub-ambient pressure, to generate combustion gases for heating a solution stream within a high temperature generator.

Advantages of the invention will be set forth in part in the description which follows, and in part will be obvious from the description, or may be learned by practice of the invention. The advantages of the invention may be realized and attained through the combinations particularly pointed out in the appended claims.

In accordance with the purposes of the invention, as broadly described herein, a pressure-staged absorption refrigeration system having a direct-fired combustion chamber is provided. The refrigeration system includes an evaporator and an absorber operatively connected to the evaporator. A plurality of generators is provided, each generator operatively connected to the absorber for receiving one of a plurality of absorption solution streams and for discharging another of the absorption solution streams. Each generator discharges one of a plurality of refrigerant vapor streams. A first generator operates at a first temperature, and a second generator operates at a sub-ambient pressure. A plurality of condensers is also provided, each condenser operatively connected to one of the generators for receiving one of the refrigerant vapor streams. Each condenser is also operatively connected to the evaporator for discharging one of a plurality of refrigerant liquid streams. A direct-fired combustion chamber for generating combustion gases is provided. The combustion chamber is cooled by a cooling stream, wherein the cooling stream may be one of the absorption solution streams. A piping arrangement transfers heat stored in the combustion gases to the absorption solution stream in the generator operating at the first temperature. A pressure equalization device may be operatively connected to the absorption solution stream cooling the combustion chamber and to the generator operating at the sub-ambient pressure or to a condenser operating at a second sub-ambient pressure. The pressure equalization device maintains the absorption solution stream cooling the combustion chamber at a pressure less than ambient.

Further, in accordance with the invention, a method for operating a pressure-staged absorption refrigeration apparatus is provided. The apparatus includes an evaporator, an absorber, a plurality of generators, a plurality of condensers and a direct-fired combustion chamber. Each generator is operatively connected to the absorber and receives one of a plurality of absorption solution streams and discharges another of the absorption solution streams. Each generator also discharges one of a plurality of refrigerant vapor streams. Each condenser is operatively connected to one of the generators and receives one of the refrigerant vapor streams. Each condenser is also operatively connected to the evaporator and discharges one of a plurality of refrigerant liquid streams. The method includes the steps of generating combustion gases in the direct-fired combustion chamber, and piping the combustion gases from the combustion chamber to a generator operating at a first temperature to vaporize refrigerant from the absorption solution stream contained therein. The method further includes the steps of cooling the combustion chamber with a cooling stream, and maintaining the cooling stream at a sub-ambient pressure. The cooling stream may be an absorption solution stream. Furthermore, the cooling stream may be maintained at the sub-ambient pressure by a pressure equalization device operatively connected to the cooling stream and to a generator operating at the sub-ambient pressure or to a condenser operating at a second sub-ambient pressure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate the related art and several embodiments of the invention. Together with the description, the drawings explain the advantages and principles of the invention. In the drawings.

DETAILED DESCRIPTION OF THE PREFERRED EMBODIMENTS

Reference will now be made in detail to the present preferred embodiments of the invention as broadly illustrated in the accompanying drawings. Wherever possible, the same reference labels will be used throughout the drawings to refer to the same or like parts.

Figure 2A:
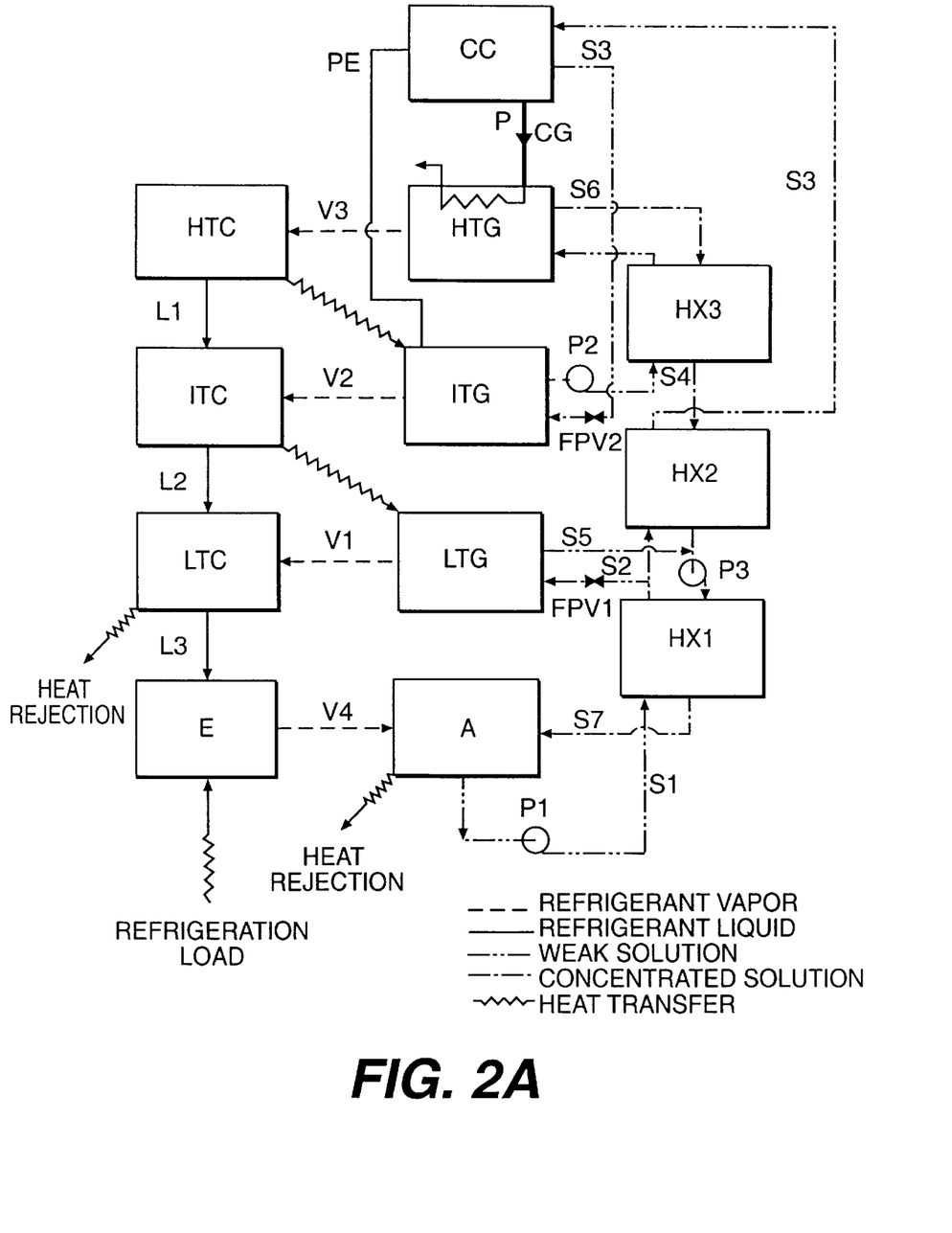
FIG. 2A is a schematic illustration of a first embodiment of a triple-effect absorption refrigeration system having a combustion chamber cooled with a sub-ambient pressure solution stream in accordance with the present invention.

An exemplary embodiment of the present invention is a triple-effect absorption refrigeration system with a combustion chamber cooled with a sub-ambient pressure solution stream as illustrated in FIG. 2A.

In accordance with the invention and as generally embodied in FIG. 2A, the pressure-staged, absorption refrigeration system includes an evaporator E. The evaporator E is the component which receives the refrigeration load, and thereby cools the building or enclosure being refrigerated. Evaporator E may be any of the evaporators that are well known in the art.

Also, in accordance with the invention an absorber A is operatively connected, via a conduit, to the evaporator E to receive a low pressure refrigerant vapor V4 discharged from the evaporator E. Absorber A is a single absorber. The structure of absorber A is well known in the art.

Further, in accordance with the invention, the absorption refrigeration system includes a plurality of generators. Each generator is operatively connected, directly or indirectly, to absorber A for receiving one of a plurality of absorption solution streams. The absorption solution streams are a mixture of refrigerant and absorption fluid, the solution streams having various concentrations of absorption fluid to refrigerant. All of the absorption solution cycling through the refrigeration system ultimately enters absorber A, is combined with refrigerant vapor V4 discharged from evaporator E, and is discharged from absorber A at its weakest concentration, i.e., having a low ratio of absorption fluid to refrigerant. Depending upon the flowpath configuration of the refrigeration system, this weakest concentration absorption solution stream flows directly to one or more generators. As the absorption solution stream passes through each generator, refrigerant vapor is boiled off, as described below, and the absorption solution stream becomes more concentrated. This more concentrated absorption solution stream is discharged from the one or more generators that are directly operatively connected to absorber A and may flow to one or more generators that are indirectly operatively connected to absorber A. As the absorption solution stream passes through each indirectly operatively connected generator, more refrigerant vapor is boiled off and the absorption solution stream becomes even more concentrated. A preferred absorption solution consists of lithium bromide-water (LiBr), but any solution that has good absorption characteristics, such as a high affinity between refrigerant and absorbent, would be suitable.

As embodied in FIG. 2A, absorber A discharges an absorption solution stream S1. Absorption solution stream S1, leaving absorber A, has the greatest ratio of refrigerant to absorption fluid of all the absorption solution streams in the system, i.e., absorption solution stream S1 has the weakest concentration.

The triple-effect absorption refrigeration system embodied in FIG. 2A feeds absorption solution from a single absorber to first and second generators in parallel. Solution from the second generator is then fed in series to a third generator. This configuration is referred to as an Inverse-Parallel Series. A first, low-temperature generator LTG, a second, intermediate-temperature generator ITG, and a third, high-temperature generator HTG are provided. Low-temperature generator LTG and intermediate-temperature generator ITG are connected in parallel with absorber A. High-temperature generator HTG is connected in series with intermediate-temperature generator ITG.

As shown in FIG. 2A, a first weak absorption solution stream S1 containing both absorption fluid and refrigerant, preferably a weak lithium bromide-water (LiBr) solution stream, is discharged from absorber A in a first piping flowpath. Preferably, a first solution stream pump P1 is provided to pump solution stream S1. Pump P1 may be any of the suitable pumps that are well known in the art. Absorption solution stream S1 splits into two portions: a first portion, absorption solution stream S2 flows to low-temperature generator LTG and a second portion, absorption solution stream S3 flows to intermediate-temperature generator ITG. Flowpath valves FPV1 and FPV2 regulate the amount of flow in absorption solution stream S2 and absorption solution stream S3, respectively. In a preferred embodiment approximately 30–65%, preferably 45–55%, of the volume of solution stream S1 is transferred to low-temperature generator LTG via solution stream S2, with the remainder being transferred to intermediate-temperature generator ITG via solution stream S3. However, it should be noted that these above-specified flow volumes are not meant to limit the scope of the invention.

As further shown in FIG. 2A, an absorption solution stream S4 is discharged from intermediate-temperature generator ITG to high-temperature generator HTG. Absorption solution stream S4 leaving intermediate-temperature generator ITG is more concentrated than solution stream S3 entering intermediate-temperature generator ITG, because the boiling off of refrigerant vapor from absorption solution stream S3 transforms it into absorption solution stream S4. As noted above, high-temperature generator HTG is connected in a series flowpath to intermediate-temperature generator ITG. Because high-temperature generator HTG is connected in series with intermediate-temperature generator ITG, all of absorption solution stream S4 is transferred from intermediate-temperature generator ITG to high-temperature generator HTG.

Preferably, a second solution stream pump P2 is provided to pump solution stream S4 from intermediate-temperature generator ITG to high-temperature generator HTG. As with pump P1, pump P2 may be any of the suitable pumps that are well known in the art.

In accordance with the invention, each generator is operatively connected to discharge an absorption solution stream for return to the absorber. As generally embodied in FIG. 2A, absorption solution stream S5 is discharged from low-temperature generator LTG, and absorption solution stream S6 is discharged from high-temperature generator HTG. Absorption solution stream S5 and absorption solution stream S6 combine to form absorption solution stream S7, which is received by absorber A. A third solution stream pump P3, such as is well known in the art, is provided in the piping flowpath to assist in returning solution stream S7 to absorber A. Pump P3 preferably is provided between heat exchanger HX1 and heat exchanger HX2, as will be described below.

Further in accordance with the invention, each generator discharges one of a plurality of refrigerant vapor streams. As embodied in FIG. 2A, low-temperature generator LTG discharges refrigerant vapor stream V1; intermediate-temperature generator ITG discharges refrigerant vapor stream V2; and high-temperature generator HTG discharges refrigerant vapor stream V3. As described below, the absorption solution streams in the generators are heated to a temperature above the vaporization temperature of the refrigerant, thereby separating the absorption solution stream entering the generator into a refrigerant vapor stream and a more concentrated absorption solution stream.

Still further in accordance with the invention, one generator operates at a first temperature. This first temperature is typically higher than the operating temperatures of the other generators. As embodied in FIG. 2A, high-temperature generator HTG operates at a first temperature higher than the operating temperatures of intermediate-temperature generator ITG and low-temperature generator LTG. Typical operating temperatures of the generators for the double-coupled condenser, inverse-parallel series, triple-effect absorption refrigeration system of FIG. 2A have been analytically derived as follows: high-temperature generator HTG operates from 400° F. to 480° F.; intermediate-temperature generator ITG operates from 240° F. to 330° F.; and low-temperature generator LTG operates from 140° F. to 210° F. These temperature ranges are for exemplary purposes only and should not be construed as limitations on the operating temperature ranges of the generators.

Also in accordance with the invention, one generator operates at a sub-ambient pressure. As embodied in FIG. 2A, intermediate-temperature generator ITG operates at a pressure less than ambient. Low-temperature generator LTG also operates at a pressure less than ambient. In contrast, high-temperature generator HTG operates at a pressure greater than ambient. Typical operating pressures for the generators of the double-coupled condenser, inverse-parallel series, triple-effect absorption refrigeration system of FIG. 2 have been analytically derived as follows: high-temperature generator HTG operates at approximately 60 psia; intermediate-temperature generator ITG operates at approximately 350–550 mmHg absolute; and low-temperature generator LTG operates at approximately 35–50 mmHg absolute. As with the temperature ranges presented above, these calculated pressures are for exemplary purposes only and should not be construed as limitations on the operating pressures of the generators.

As described below, a combustion chamber is provided for heating the absorption solution stream in the high-temperature generator to a first temperature, thereby separating the absorption solution stream in the high-temperature generator into a refrigerant vapor and a more concentrated solution stream. Heating absorption solution stream S4 in high-temperature generator HTG raises solution stream S4 to a first temperature, which is at or above the vaporization temperature of the refrigerant in solution stream S4. At this temperature, some of the refrigerant in solution stream S4 is evaporated and driven off in the form of refrigerant vapor stream V3. The remaining absorption solution in high-temperature generator HTG is then discharged as absorption solution stream S6 approximately at the first temperature.

As further described below, heat discharged from one of the plurality of condensers may provide the energy for separating absorption solution stream S2 in low-temperature generator LTG into refrigerant vapor stream V1 and more concentrated absorption solution stream S5. Similarly, heat discharged from another of the plurality of condensers may provide the energy for separating absorption solution stream S3 in intermediate-temperature generator ITG into refrigerant vapor stream V2 and more concentrated absorption solution stream S4.

Preferably, one or more solution-to-solution heat exchangers are provided in the absorption solution stream flowpaths to preheat the solution streams entering the generators with heat from the absorption solution streams which are returning to the absorber. This preheating increases the thermal Coefficient of Performance (COP) of the system.

As embodied in FIG. 2A, a first solution-to-solution heat exchanger HX1 is operatively connected to transfer heat from absorption solution stream S7 to absorption solution stream S1. First solution-to-solution heat exchanger HX1 is provided in the parallel flowpath for preheating solution stream S1 with solution stream S7. Solution stream S7 includes highly concentrated solution stream S6 discharged from high-temperature generator HTG and the less concentrated solution stream S5 discharged from low-temperature generator LTG. Preheated solution stream S1 then splits into two portions: solution stream S2 and solution stream S3. Preheated solution stream S2 flows to low-temperature generator LTG.

Preheated solution stream S3 continues in the parallel flowpath to a second solution-to-solution heat exchanger HX2. In HX2, preheated solution stream S3 is further preheated by concentrated solution stream S6 from high-temperature generator HTG. Solution stream S3 then enters intermediate-temperature generator ITG.

Solution stream S4, discharged from intermediate-temperature generator ITG in the series flowpath, passes through a third solution-to-solution heat exchanger HX3, where it is preheated by hot concentrated solution stream S6 from high-temperature generator HTG. Preheated solution stream S4 then enters high-temperature generator HTG. The structures of the solution-to-solution heat exchangers are well known to persons of ordinary skill in the art.

In accordance with the invention, a plurality of condensers are provided. Each condenser is operatively connected to one of the generators for receiving one of the refrigerant vapor streams. As depicted in FIG. 2A, refrigerant vapor stream V3, having been boiled off in high-temperature generator HTG, flows into high-temperature condenser HTC. Similarly, refrigerant vapor stream V2, having been boiled off in intermediate-temperature generator ITG, flows into intermediate-temperature condenser ITC, and refrigerant vapor stream V1, having been boiled off in low-temperature generator LTG, flows into low-temperature condenser LTC.

Further in accordance with the invention, each condenser is operatively connected to evaporator E for discharging one of a plurality of refrigerant liquid streams. As generally embodied in FIG. 2A, condensers LTC, ITC and HTC condense refrigerant vapor streams V1, V2 and V3 into refrigerant liquid streams, respectively, and in so doing, release heat. High-temperature condenser HTC is operatively connected to transfer refrigerant liquid stream L1 to intermediate-temperature condenser ITC. Refrigerant liquid stream L1 includes the condensate of refrigerant vapor stream V3. Similarly, intermediate-temperature condenser ITC is operatively connected to transfer refrigerant liquid stream L2 to low-temperature condenser LTC. Refrigerant liquid stream L2 includes refrigerant liquid stream L1 and the condensate of refrigerant vapor stream V2. Low-temperature condenser LTC is operatively connected to transfer refrigerant liquid stream L3 to evaporator E. Refrigerant liquid stream L3 includes refrigerant liquid stream L2 and the condensate of refrigerant vapor stream V3.

In a double-coupled condenser triple-effect refrigeration system as embodied in FIG. 2A, the intermediate- and high-temperature condensers are operatively connected to exchange heat with the low- and intermediate-temperature generators, respectively. Intermediate-temperature condenser ITC is operatively connected to exchange heat with low-temperature generator LTG. The energy from the heat separates absorption solution stream S2 into refrigerant vapor stream V1 and more concentrated absorption solution stream S5. Similarly, high-temperature condenser HTC is operatively connected to exchange heat with intermediate-temperature generator ITG, thereby separating absorption solution stream S3 into refrigerant vapor stream V2 and absorption solution stream S4.

Although shown schematically as a separate component in FIG. 2A, high-temperature condenser HTC may be physically located adjacent to or combined with intermediate-temperature generator ITG so that refrigerant vapor stream V3 transfers heat to absorption solution stream S3 in intermediate-temperature generator ITG. This heat transfer between high-temperature condenser HTC and intermediate-temperature generator ITG causes refrigerant vapor stream V3 to condense in high-temperature condenser HTC, while at the same time raising the temperature of solution stream S3 in intermediate-temperature generator ITG to a second temperature. This second temperature is lower than the first temperature of solution stream S4 in high-temperature generator HTG, but still causes some of the refrigerant in solution stream S3 to flash into refrigerant vapor.

As shown in FIG. 2A, refrigerant liquid stream L1 from high-temperature condenser HTC and refrigerant vapor stream V2 from intermediate-temperature generator ITG flow to intermediate-temperature condenser ITC. Although shown schematically as a separate component in FIG. 2A, intermediate-temperature condenser ITC may be physically located adjacent to or combined with low-temperature generator LTG so that refrigerant vapor stream V2 and high temperature liquid stream L1 from high-temperature condenser HTC transfer heat to the first portion of solution stream S1 in low-temperature generator LTG. This heat transfer between intermediate-temperature condenser ITC and low-temperature generator LTG condenses refrigerant vapor V2 in intermediate-temperature condenser ITC, while at the same time raising the temperature of the first portion of solution stream S1 in low-temperature generator LTG to a third temperature. This third temperature is lower than the first and second temperatures, but still causes some of the refrigerant in solution stream S2 in low-temperature generator LTG to flash into refrigerant vapor.

As shown in FIG. 2A, refrigerant liquid stream L2 from intermediate-temperature condenser ITC and refrigerant vapor stream V1 from low-temperature generator LTG flow to low-temperature condenser LTC. Heat is rejected at low-temperature condenser LTC, thereby condensing refrigerant vapor stream V1 into liquid.

The cool refrigerant liquid stream L3 flows from low-temperature condenser LTC back to evaporator E in order to exchange heat with the refrigeration load. As refrigerant liquid stream absorbs heat from the refrigeration load, it flashes into refrigerant vapor stream V4. Low pressure refrigerant vapor stream V4 is discharged from the evaporator E and flows to absorber A where it is combined with concentrated solution stream S7, beginning the cycle over again.

In accordance with the invention, there is provided a direct-fired combustion chamber for generating combustion gases for heating one of the absorption solution streams within one of the generators. As illustrated in the embodiment of FIG. 2A, combustion chamber CC generates combustion gases CG for heating absorption solution stream S4 within high-temperature generator LTG. Combustion chamber CC is a direct-fired combustion chamber and is a separate unit from high-temperature generator HTG.

Further in accordance with the invention, the combustion chamber is operatively connected to and cooled by one of the absorption solution streams. As illustrated in the embodiment of FIG. 2A, combustion chamber CC is cooled by absorption solution stream S3 that is discharged by solution-to-solution heat exchanger HX2. Combustion chamber CC is typically insulated with refractory material so that only a small, specified amount of combustion heat is transferred to absorption solution stream S3. Cooling combustion chamber CC reduces the radiant environment within the chamber and, thereby, reduces the amount of NOx emissions.

Absorption solution stream S3 is at a pressure less than ambient. Even if the absorption solution within solution stream S3 boils, the boiling occurs at a pressure less than ambient, and thus, combustion chamber CC is exempt from the requirements of ASME, Section 1.

As absorption solution stream S3 cools combustion chamber CC, its temperature may reach the vaporization temperature of the refrigerant, and the concentration of solution stream S3 may increase as refrigerant in solution stream S3 is vaporized. If this occurs, then an absorption solution stream S3' (not shown) that is more concentrated than absorption solution stream S3 exits combustion chamber CC. Alternatively, if the temperature of absorption solution stream S3 that cools combustion chamber CC does not reach the vaporization temperature of the refrigerant, then solution stream S3, as illustrated in FIG. 2A, exits combustion chamber CC at the same concentration that it entered combustion chamber CC.

The absorption solution stream used to cool combustion chamber CC may be taken from other points within the system. For instance, rather than cooling combustion chamber CC with absorption solution stream S3 that is discharged from solution-to-solution heat exchanger HX2, combustion chamber CC may be cooled with absorption solution stream S3 that is discharged from heat exchanger HX1. The first option is preferred because solution stream S3 exiting heat exchanger HX2 has a higher temperature and pressure than solution stream S3 exiting heat exchanger HX1, and its use results in a higher overall efficiency.

As embodied in FIG. 2A, absorption solution stream S3 flows through combustion chamber CC and intermediate-temperature generator ITG in a series arrangement. For a series arrangement, the driving force for transferring solution stream S3 from combustion chamber CC to intermediate-temperature generator ITG may be gravity. If gravity is relied upon as the driving force, the relative elevation of, and piping design between, the two components is critical. Combustion chamber CC would need to be placed above intermediate-temperature generator ITG in order to transfer solution stream S3 to intermediate-temperature generator ITG. Alternatively, a pump (not shown) may be operatively connected to absorption solution stream S3, between combustion chamber CC and intermediate-temperature generator ITG, to provide the driving force.

In accordance with the invention there is provided a piping arrangement for transferring heat stored in the combustion gases to the absorption solution stream in the generator operating at the first temperature. As embodied in FIG. 2A, piping arrangement P transfers combustion gases CG from combustion chamber CC to high-temperature generator HTG, where most of the heat in the combustion products is released. Piping arrangement P ensures that combustion chamber CC is sufficiently separated from high-temperature generator HTG so that the flame of direct-fired combustion chamber CC does not contact high-temperature generator HTG.

Typically, piping arrangement P may include gas piping insulated with high temperature insulation. The piping may be any piping that is capable of withstanding temperatures of 2600° F. to 3200° F. with good resistance to corrosion. The preferred length of piping arrangement P ranges from 1 to 5 feet, although lengths outside this range fall within the scope of the present invention. Increasing the insulation and minimizing the run reduces the energy losses due to separating combustion chamber CC from high-temperature generator HTG. Such piping arrangements are well known to persons skilled in the art.

In accordance with the invention there may be provided a pressure equalization device operatively connected to the absorption solution stream cooling the combustion chamber and to the generator operating at a sub-ambient pressure. The pressure equalization device is for maintaining the absorption solution stream cooling the combustion chamber at a pressure less than ambient. As embodied in FIG. 2A, pressure equalization device PE is operatively connected between absorption solution stream S3 and intermediate-temperature generator ITG. Pressure equalization device PE may include a pressure equalization channel or a simple pipe. Such pressure equalization devices are well known to persons skilled in the art. Pressure equalization device PE limits the boiling pressure of solution stream S3 cooling the combustion chamber to the pressure of intermediate-temperature generator ITG.

Alternatively, the pressure equalization device may be operatively connected to the absorption solution stream cooling the combustion chamber and to a condenser operating at a second sub-ambient pressure. As embodied in FIG. 2B, pressure equalization device PE is operatively connected between absorption solution stream S3 cooling combustion chamber CC and intermediate-temperature condenser ITC. In this configuration, pressure equalization device PE limits the boiling pressure of solution stream S3, which cools the combustion chamber, to the pressure of intermediate-temperature condenser ITC.

Preliminary calculations show that if the wall of combustion chamber CC is insulated by ½ inch thick refractory material having a thermal conductivity of 1.0 BTU-in/hr-ft$^2$-°F., the heat transferred to absorption solution stream S3, used to cool combustion chamber CC, would be 3% of the burner input. Moreover, the surface temperature of the refractory liner would be approximately 500° F. cooler than with an adiabatic liner. Relative to an adiabatic combustion chamber, this would substantially reduce the amount and cost of the refractory material, and would significantly reduce the amount of NOx emissions.

Figure 3:
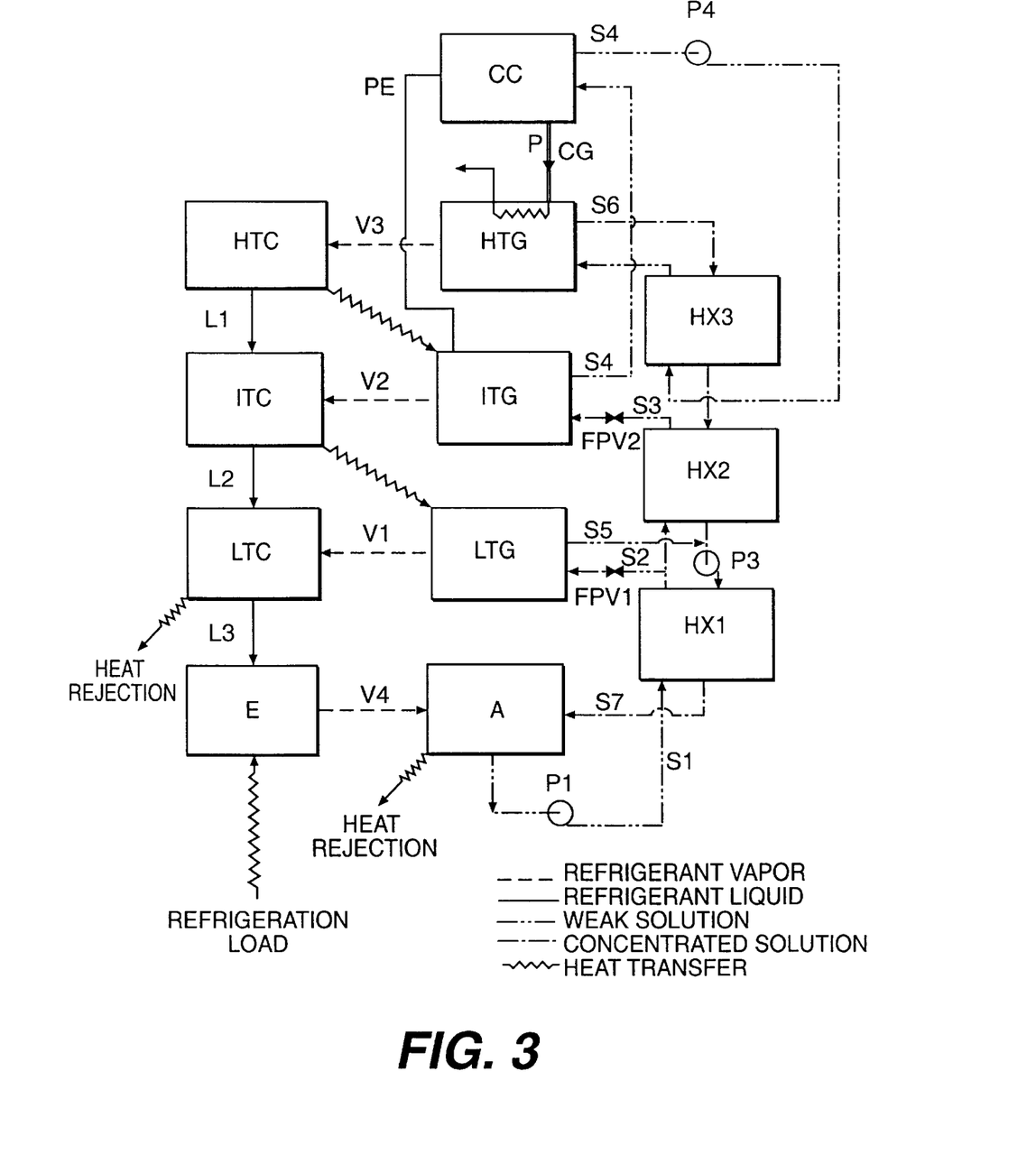
FIG. 3 is a schematic illustration of a second embodiment of a triple-effect absorption refrigeration system having a combustion chamber cooled with a sub-ambient pressure solution stream in accordance with the present invention.

A second embodiment of the present invention is shown in FIG. 3. In this embodiment, absorption solution stream S4 discharged from intermediate-temperature generator ITG is used to cool combustion chamber CC.

As with the first embodiment, the driving force for transferring solution stream S4 between combustion chamber CC and intermediate-temperature generator ITG may be gravity. If gravity is relied upon as the driving force, intermediate-temperature generator ITG would need to be elevated above combustion chamber CC in order to transfer solution stream S4 to combustion chamber CC. Alternatively, a pump (not shown) may be operatively connected to absorption solution stream S4, between combustion chamber CC and intermediate-temperature generator ITG, to provide the driving force.

Upon exiting combustion chamber CC, absorption solution stream S4 is directed to high-temperature generator HTG. As shown in FIG. 3, solution stream S4 exits combustion chamber CC and passes through the third solution-to-solution heat exchanger HX3. Pump P4 may be provided to pump solution stream S4 from combustion chamber CC to high-temperature generator HTG. Within heat exchanger HX3, solution stream S4 is preheated by concentrated solution stream S6 from high-temperature generator HTG. Preheated solution stream S4 then enters high-temperature generator HTG.

Figure 2B:
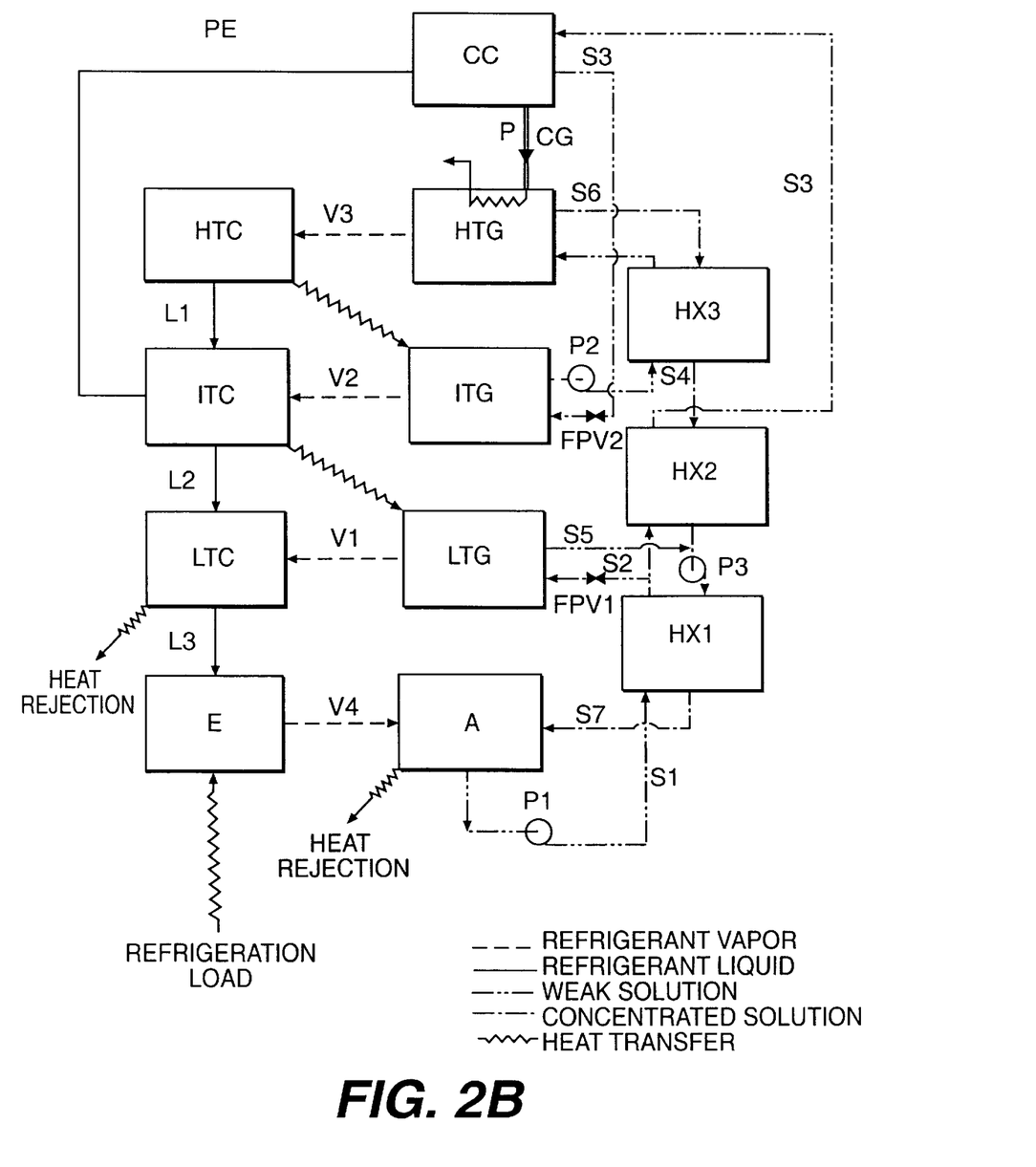
FIG. 2B is a schematic illustration of the embodiment of FIG. 2A showing an alternative connectivity of the pressure equalization device.

As with the first embodiment, when absorption solution stream S4 cools combustion chamber CC, its temperature may reach the vaporization temperature of the refrigerant, and the concentration of stream S4 may increase as refrigerant in stream S4 is vaporized. If this occurs, then an absorption solution stream S4' (not shown) that is more concentrated than absorption solution stream S4 exits combustion chamber CC. However, if the temperature of absorption solution stream S4 cooling combustion chamber CC does not reach the vaporization temperature of the refrigerant, then solution stream S4, as illustrated in FIG. 2B, exits combustion chamber CC at the same concentration that it entered combustion chamber CC.

Figure 4:
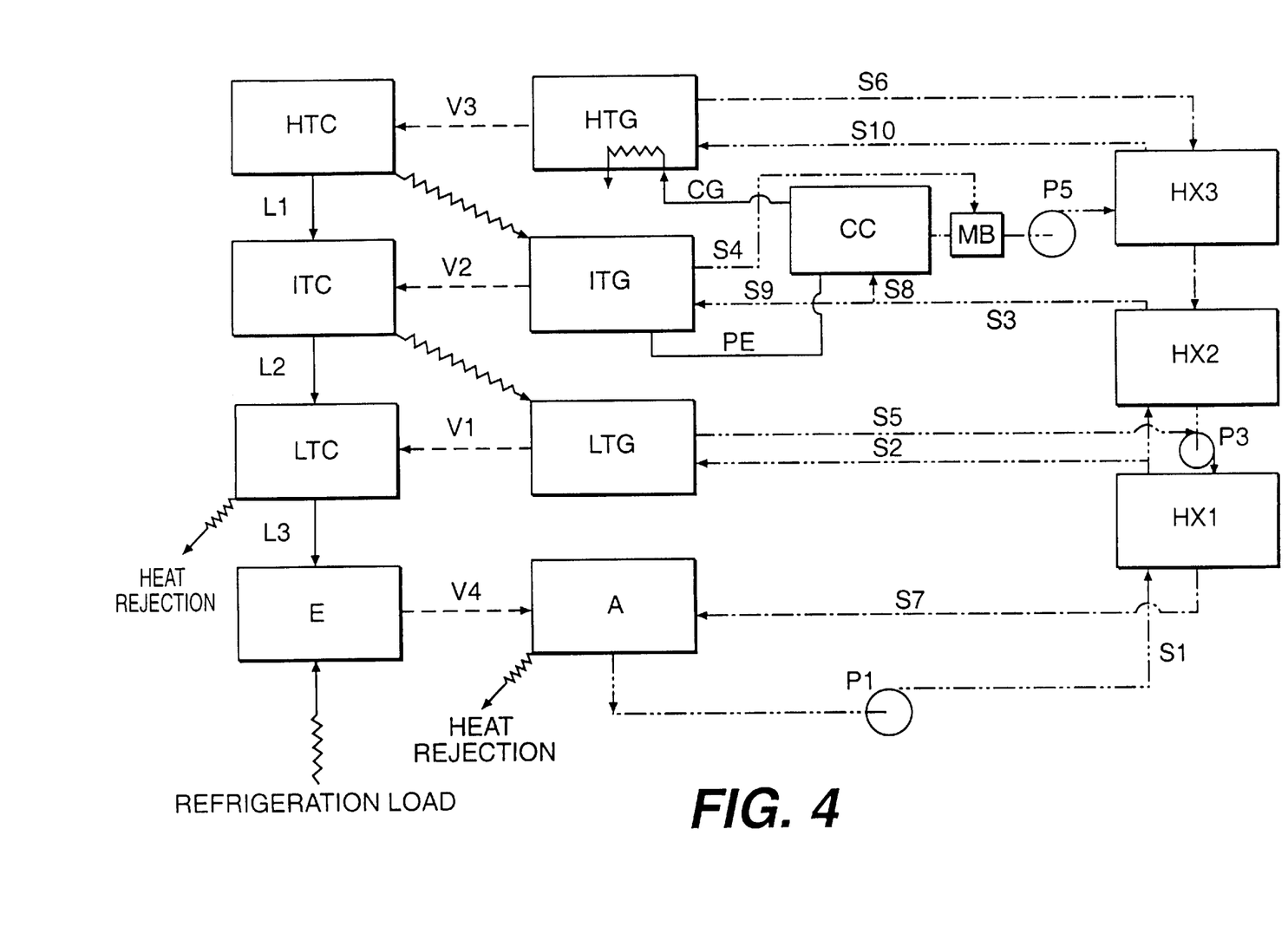
FIG. 4 is a schematic illustration of a third embodiment of a triple-effect absorption refrigeration system having a combustion chamber cooled with a sub-ambient pressure solution stream in accordance with the present invention.

A third embodiment of the present invention is shown in FIG. 4. Absorption solution stream S3 may flow through combustion chamber CC and intermediate-temperature generator ITG in a parallel arrangement. Such a parallel flow arrangement requires that absorption solution stream S3 split into absorption solution streams S8 and S9. Absorption solution stream S8 is operatively connected to and cools combustion chamber CC.

Absorption solution stream S9 flows into intermediate-temperature generator ITC, where some of the refrigerant in solution stream S9 is driven off in the form of refrigerant vapor stream V2. The remaining absorption solution in intermediate-temperature generator ITC is then discharged as absorption solution stream S4.

Absorption solution stream S4, discharged from intermediate-temperature generator ITC, and absorption solution stream S8, discharged from combustion chamber CC, are combined into a single absorption solution stream S10 at mixing box MB. A pump P5 may be operatively connected to absorption solution stream S10 to provide the driving force for transferring solution stream S10 to high-temperature generator HTG. Preferably, pump P5 is provided between mixing box MB and solution-to-solution heat exchanger HX3. Mixing box MB combines solution stream S4 with solution stream S8 into a single solution stream S10 so that a single pump P5 may be used to pump solution stream S10 to a higher stage.

In the parallel solution flow arrangement of FIG. 4, the solution velocity in combustion chamber CC may be relatively low. However, in the parallel solution flow arrangement, there is no restriction on the elevation of intermediate-temperature generator ITC relative to the elevation of combustion chamber CC.

Compared to a condenser-coupled triple-effect absorption refrigeration system having a first stage generator directly contacted by the combustion chamber flame, the coefficient of performance (COP) of the overall system of the present invention is decreased. This is because part of the heat from the primary heat source is input to the system at a lower temperature. For the system as shown in FIG. 2A, a thermodynamic analysis was performed to investigate the effect on the overall cycle COP of the heat released at the intermediate pressure, solution stream cooled chamber. When 3% of the heat input to the combustion chamber is transferred to the sub-ambient solution stream, the cycle COP (defined by $Q_{evaporator}/(Q_{high\ pressure\ generator}+Q_{combustion\ chamber})$) decreases from 1.720 to 1.702.

It is further calculated for the system shown in FIG. 2A that the sub-ambient absorption solution stream inside the combustion chamber will boil when the percentage of heat from the combustion chamber transferred to the solution stream exceeds approximately 8%. Thus, it is desirable to limit the amount of heat transferred inside the combustion chamber to the sub-ambient absorption solution stream to a small amount, preferably from 2–15% and eve more preferably less than 10% of the heat of combustion. Moreover, it has been analytically determined that the amount of heat transferred to the sub-ambient cooling absorption solution stream has little impact on other key parameters such as the maximum temperature of the system, the pressures within the system, and the concentrations of the absorption solution streams within the system. The above description of the embodiments of the invention has been presented for purposes of illustration and description. It is not intended to be exhaustive or to limit the invention to the precise forms disclosed. For instance, triple-effect absorption refrigeration systems other than the inverse-parallel series described in the embodiments may be incorporated into the invention. Such refrigeration systems are fully described in U.S. patent application Ser. No. 08/743,373, as noted above. Modifications and variations are possible in light of the above teachings, or may be acquired from practice of the invention. The embodiments were described in order to explain the principles of the invention, and its practical application was described to enable one skilled in the art to utilize the invention in various embodiments and with various modifications as are suited to the particular use contemplated. Thus, it is intended that the present invention cover the modifications and variations of this invention provided they come within the scope of the appended claims and their equivalents.

We claim:

1. A pressure-staged absorption refrigeration apparatus having a direct-fired combustion chamber, the refrigeration apparatus comprising:

an evaporator;

an absorber operatively connected to the evaporator;

a plurality of generators, each generator operatively connected to the absorber and receiving one of a plurality of absorption solution streams and discharging another of the absorption solution streams, each generator discharging one of a plurality of refrigerant vapor streams, a first generator operating at a first temperature, and a second generator operating at a sub-ambient pressure;

a plurality of condensers, each condenser operatively connected to one of the generators and receiving one of the refrigerant vapor streams, each condenser operatively connected to the evaporator and discharging one of a plurality of refrigerant liquid streams;

a direct-fired combustion chamber generating combustion gases; and a piping arrangement for transferring heat stored in the combustion gases to the absorption solution stream in the generator operating at the first temperature wherein the combustion chamber is cooled by a cooling stream.

2. The apparatus of claim 1 wherein the cooling stream is one of the absorption solution streams.

3. The apparatus of claim 2 wherein the cooling stream is maintained at a pressure less than ambient by a pressure equalization device operatively connected to the cooling stream.

4. The apparatus of claim 3 wherein the pressure equalization device is operatively connected to the second generator.

5. The apparatus of claim 4 wherein:

the plurality of generators includes a low temperature generator, an intermediate temperature generator and a high temperature generator; and the plurality of condensers includes a first condenser transferring a first refrigerant liquid stream to a second condenser, the second condenser transferring a second refrigerant liquid stream to a third condenser, and the third condenser transferring a third refrigerant liquid stream to the evaporator, the first and second condensers operatively connected to exchange heat with the intermediate and low temperature generators, respectively.

6. The apparatus of claim 5 wherein:

the absorber discharges a first absorption solution stream;

the low temperature generator receives a first portion of the first absorption solution stream and discharges a first refrigerant vapor stream to the third condenser;

the intermediate temperature generator receives a second portion of the first absorption solution stream, discharges a second absorption solution stream, and discharges a second refrigerant vapor stream to the second condenser; and the high temperature generator receives the second absorption solution stream and discharges a third refrigerant vapor stream to the first condenser, the low temperature and high temperature generators discharging third and fourth absorption solution streams, respectively, for return to the absorber.

7. The apparatus of claim 6 wherein the intermediate temperature generator operates at the sub-ambient pressure, and the combustion chamber is cooled by at least a portion of the second portion of the first absorption solution stream.

8. The apparatus of claim 7 further comprising a first heat exchanger transferring heat from the combined third and fourth absorption solution streams to the first absorption solution stream, a second heat exchanger transferring heat from the fourth absorption solution stream to the second portion of the first absorption solution stream, and a third heat exchanger transferring heat from the fourth absorption solution stream to the second absorption solution stream.

9. The apparatus of claim 8 further comprising a first pump for pumping the first absorption solution stream, a second pump for pumping the second absorption solution stream, and a third pump for pumping the combined third and fourth absorption solution streams.

10. The apparatus of claim 6 wherein the intermediate temperature generator operates at the sub-ambient pressure, and the combustion chamber is cooled by at least a portion of the second absorption solution stream.

11. The apparatus of claim 10 further comprising a first heat exchanger transferring heat from the combined third and fourth absorption solution streams to the first absorption solution stream, a second heat exchanger transferring heat from the fourth absorption solution stream to the second portion of the first absorption solution stream, and a third heat exchanger transferring heat from the fourth absorption solution stream to the second absorption solution stream.

12. The apparatus of claim 11 further comprising a first pump for pumping the first absorption solution stream, a second pump for pumping the second absorption solution stream, and a third pump for pumping the combined third and fourth absorption solution streams.

13. The apparatus of claim 3 wherein a one of said condensers operates at a second sub-ambient pressure and the pressure equalization device is operatively connected to the condenser operating at the second sub-ambient pressure.

14. The apparatus of claim 13 wherein:

the absorber discharges a first absorption solution stream;

the low temperature generator receives a first portion of the first absorption solution stream and discharges a first refrigerant vapor stream to the third condenser;

the intermediate temperature generator receives a second portion of the first absorption solution stream, discharges a second absorption solution stream, and discharges a second refrigerant vapor stream to the second condenser; and the high temperature generator receives the second absorption solution stream and discharges a third refrigerant vapor stream to the first condenser, the low temperature and high temperature generators discharging third and fourth absorption solution streams, respectively, for return to the absorber.

15. The apparatus of claim 14 wherein the intermediate temperature generator operates at the sub-ambient pressure, and the combustion chamber is cooled by the second portion of the first absorption solution stream.

16. The apparatus of claim 14 wherein the intermediate temperature generator operates at the sub-ambient pressure, and the combustion chamber is cooled by the second absorption solution stream.

17. A combustion system for a pressure-staged absorption refrigeration apparatus, the combustion system comprising:

a direct-fired combustion chamber generating combustion gases, the chamber cooled by a sub-ambient pressure absorption solution stream;

means for transferring energy stored in the combustion gases to an absorption solution stream in a generator operating at a first temperature; and means for maintaining the sub-ambient pressure absorption solution stream at a sub-ambient pressure.

18. The combustion system of claim 17 wherein the means for transferring energy stored in the combustion gases includes a piping arrangement that ensures that the generator operating at the first temperature will not be touched by the flame of the combustion chamber.

19. The combustion system of claim 17 wherein the means for maintaining the sub-ambient pressure absorption solution stream at the sub-ambient pressure includes a pressure equalization device operatively connected to the sub-ambient pressure absorption solution stream and to a generator or a condenser operating at the sub-ambient pressure.

20. The combustion system of claim 19 wherein the pressure equalization device includes a pipe.

21. The combustion system of claim 17 wherein from 2–15%, of a heat of combustion is transferred to the sub-ambient pressure absorption solution stream.

22. A method for operating a pressure-staged absorption refrigeration apparatus including an evaporator, an absorber, a plurality of generators, each generator operatively connected to the absorber and receiving one of a plurality of absorption solution streams and discharging another of the absorption solution streams, each generator discharging one of a plurality of refrigerant vapor streams, a plurality of condensers, each condenser operatively connected to one of the generators and receiving one of the refrigerant vapor streams, each condenser operatively connected to the evaporator and discharging one of a plurality of refrigerant liquid streams, and a direct-fired combustion chamber, the method comprising:

generating combustion gases in the direct-fired combustion chamber;

piping the combustion gases from the combustion chamber to a generator operating at a first temperature to vaporize refrigerant from the absorption solution stream contained therein; cooling the combustion chamber with a cooling stream; and maintaining the cooling stream at a sub-ambient pressure.

23. The method of claim 22 wherein the cooling stream is an absorption solution stream.

24. The method of claim 23 wherein the cooling stream is maintained at the sub-ambient pressure by a pressure equalization device operatively connected to the cooling stream and to a generator operating at the sub-ambient pressure or to a condenser operating at the sub-ambient pressure.

25. The method of claim 24 further comprising:

utilizing heat from a first condenser receiving a refrigerant vapor stream from the generator operating at the first temperature for vaporizing refrigerant from an absorption solution stream in a generator operating at a second temperature, the second temperature being lower than the first temperature.

26. The combustion system of claim 21, wherein less than 10% of the heat of combustion is transferred to the sub-ambient pressure absorption solution stream.

* * * * *